UNITED STATES PATENT OFFICE.

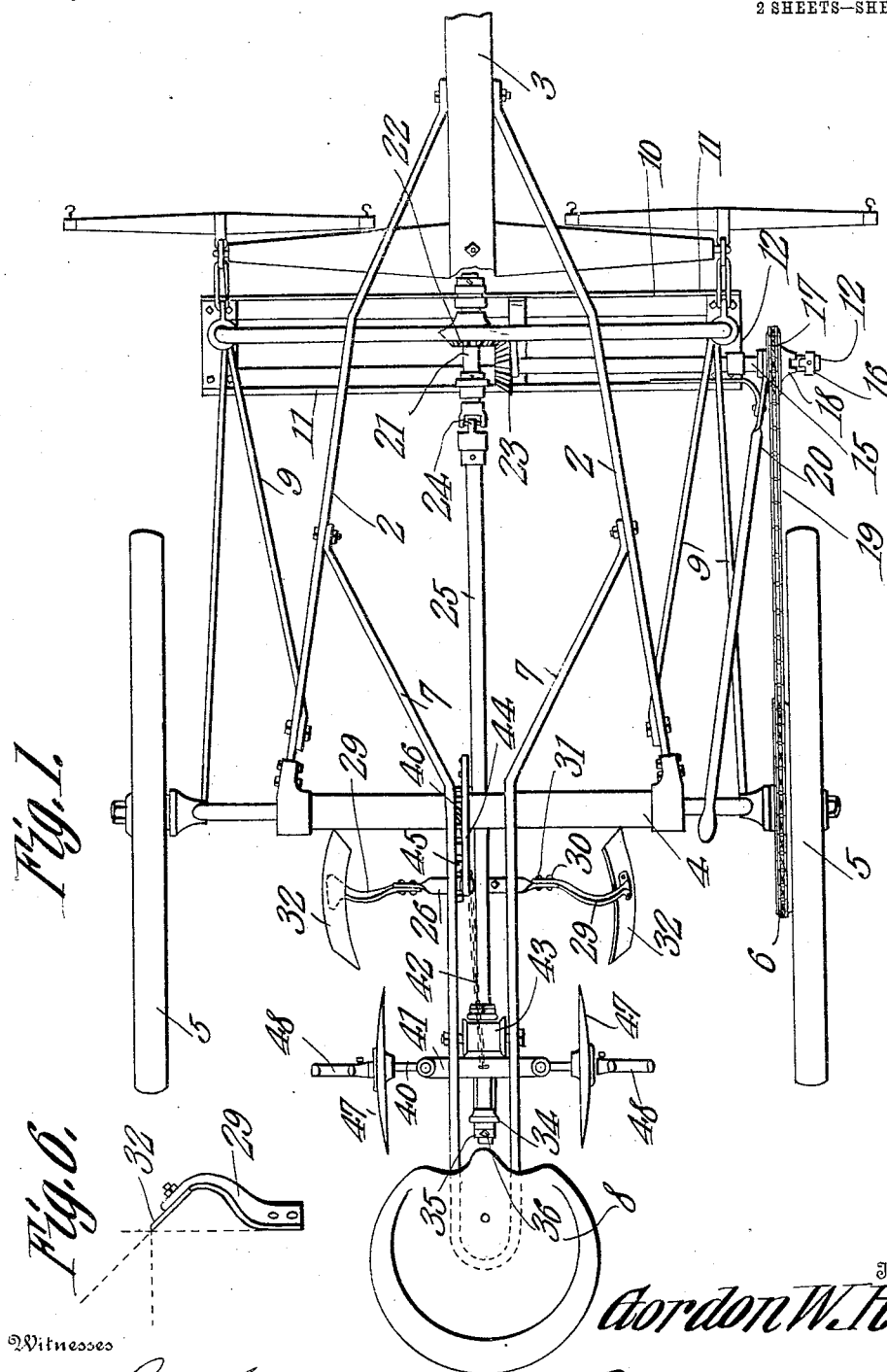

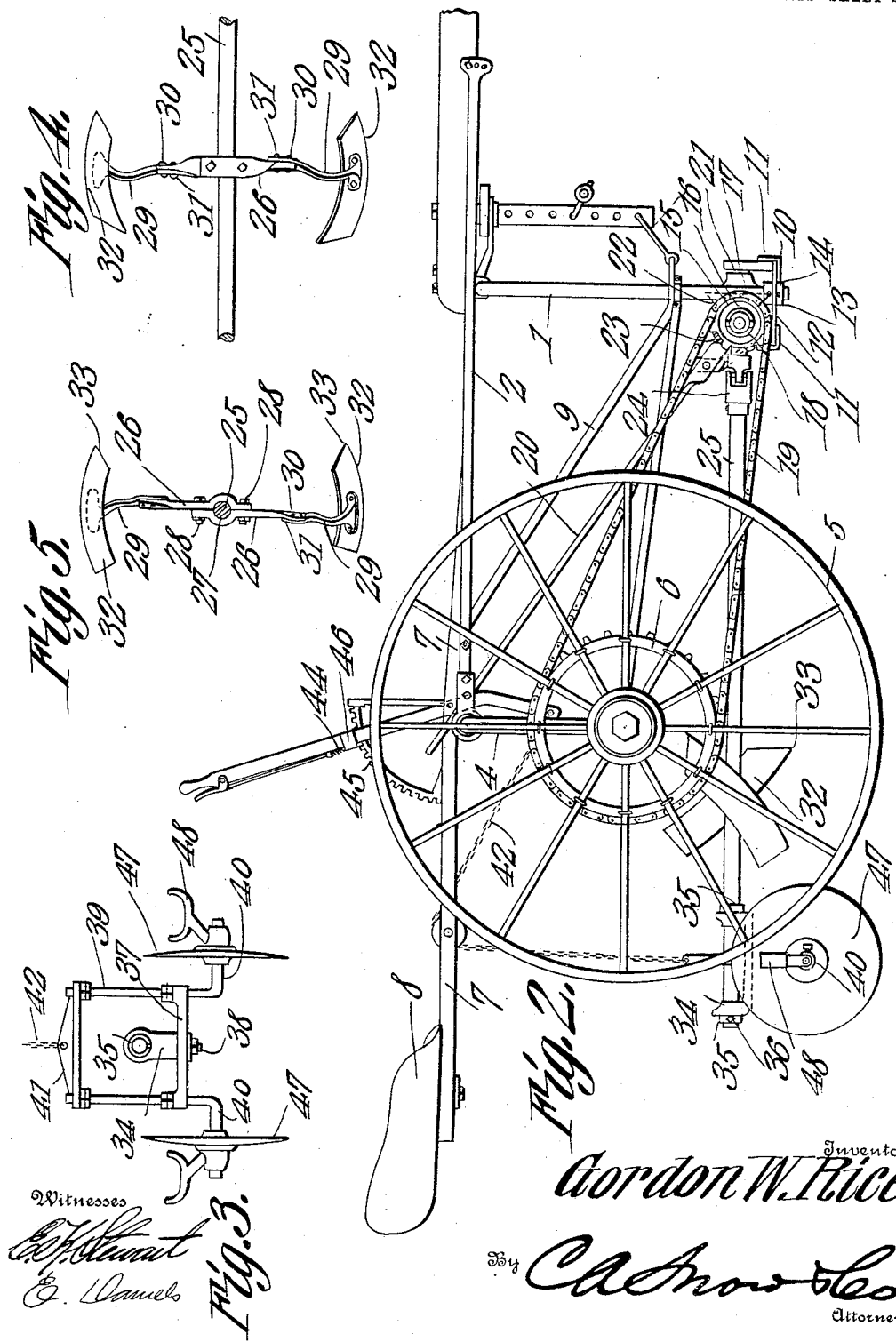

GORDON W. RICE, OF CHAMPAIGN, ILLINOIS.

COTTON-CHOPPER.

941,098.  Specification of Letters Patent.  Patented Nov. 23, 1909.

Application filed March 24, 1909. Serial No. 485,495.

*To all whom it may concern:*

Be it known that I, GORDON W. RICE, a citizen of the United States, residing at Champaign, in the county of Champaign and State of Illinois, have invented a new and useful Cotton-Chopper, of which the following is a specification.

This invention has relation to cotton choppers and it consists in the novel construction and arrangement of its parts, as hereinafter shown and described.

The object of the invention is to provide an attachment in the form of a cotton chopper which may be easily and quickly applied to the frame of a sulky cultivator, it being understood that prior to the attachment of the cotton chopping device, the cultivator beams and plows are removed from the frame.

With the above object in view, the chopper consists of a frame which is adapted to be applied to the forward arch-bar of the cultivator frame, and upon which said frame is journaled to a stub shaft. Means is provided for transmitting rotary movement from one of the supporting wheels of the cultivator frame to said stub shaft, and a second shaft is connected with the stub shaft by means of a universal joint. A lifting device is mounted upon the arch axle of the cultivator frame and is operatively connected with the rear end of the last said shaft, and chopping hoes are mounted upon the last said shaft, as are also disks. The said disks are located behind the chopping hoes and act as carrier wheels for the rear end of said shaft, and may be used for the purpose of listing the soil against the standing plants after the row of plants has been operated upon by the hoes. The said disks are so mounted that they may be swung by an operator using his feet in stirrups provided in connection with the disks, whereby the disks may be turned laterally, and thus act as guiding wheels, whereby the chopping hoes can be guided directly over the row of plants being chopped. The primary object of the disks is to act as carriers and as guiding wheels, as mentioned.

In the accompanying drawings:—Figure 1 is a plan view of the cultivator frame, with the cotton chopper attached thereto. Fig. 2 is a side elevation of the same. Fig. 3 is an end elevation of the carrier and steering device at the rear end of the chopper shaft. Fig. 4 is a side elevation of the chopping blades. Fig. 5 is an end elevation of the arms which carry the chopping blades. Fig. 6 is a detail view, showing the angle at which the chopping blade is arranged.

The cultivator frame consists of the forward arch bar 1, which is held in an upright position by the bars 2. The forward ends of the bars 2 are attached to the rear end portion of the tongue 3, while the rear ends of the said bars 2 are connected with the upper or intermediate portion of the arch axle 4. The axle 4 is supported upon the ground wheels 5, one of which is provided with a sprocket rim 6. Seat bars 7 are attached at their forward ends to the bars 2 at points intermediate of the ends thereof, and said bars extend back over the intermediate portion of the axle 4. The seat 8 is supported at the rear ends of the bars 7. The brace-bars 9 are connected at their lower forward ends with the lower portions of the arch bar 1, and at their rear ends with the axle 4 and the bars 2 in the manner illustrated.

The cotton chopper consists of the frame 10, which, in turn, is made up of the angle-bars 11, which are connected together at their ends by the end strips 12. The said strips 12 are perforated, and the lower ends of the arch bar 1 pass through the said perforations, and the said strips 12 are held in adjusted position upon the lower portions of the arch bar 1 by means of the collars 13 and set screws 14, which are located against the upper and lower sides of the said strips 12, and upon the lower portions of the arch bar 1. A shaft 15 is journaled for rotation upon the frame 10, and is provided at its outer end with a clutch member 16. The sprocket wheel 17 is slidably mounted upon the shaft 15 and is provided with a clutch hub 18, which, at times, is adapted to engage the clutch member 16. The sprocket chain 19 passes around the sprocket wheel 17 and the sprocket rim 6. A lever 20 is fulcrumed upon the frame 10, and is provided with a working end which engages the hub of the sprocket wheel 17, and which, when the said lever is swung at its power end, is adapted to move the sprocket wheel into engagement with the clutch member 16. A stub shaft 21 is also journaled for rotation upon the frame 10, and is provided with a beveled pinion 22, which meshes with a beveled pinion 23, fixed at the inner end of the shaft 15. A universal joint 24 operatively connects the stub shaft 21 with the chopper shaft 25. The chopper arms 26 are provided at their inner portions with the clamp recesses 27, which are adapted to receive the shaft 25, and which are secured in adjusted position thereon by means of the clamping bolts 28, which pass transversely through perforations provided in the overlapping inner end portions of the said arms 26. The outer end portions of the said arms 26 are twisted laterally, and the blade shanks 29 are attached to the outer ends of the said arms 26. The connection between the arms 26 and the shanks 29 consists, in each instance, of a pin 30, which is preferably metallic, and which passes through registering perforations in the parts, and also a pin 31, which is preferably wood, and is known as a "breaking pin", which passes transversely through registering perforations provided in the overlapping parts 26 and 29. The shanks 29 are also twisted laterally in the manner as illustrated in Figs. 4 and 5 of the drawings. Chopping blades 32 are fixed to the outer ends of the shanks 29, and the said blades are pitched at an angle of approximately 45 degrees to the line of draft of the implement, and at approximately the same angle to the surface of the ground. The said blades 32 are spirally disposed and are provided with the forward pointed ends 33 which form angles, the apexes of which occur at the ends of the cutting edges of the said blades 32.

A casting 34 is adjustably mounted upon the rear end portion of the shaft 25 and is held in an adjusted position thereon by means of the collars 35, each of which is provided in turn with a set screw 36. A cross-arm 37 is pivotally connected with the casting 34 by means of a pivot bolt 38 (best shown in Fig. 3). The shanks 39 of the spindles 40 are mounted at the ends of the cross-arm 37, and the upper end portions of the said shanks 39 are connected together by a cross-bar 41. A chain 42 is connected at its lower end with the said cross-bar 41 and passes up over a pulley 43, journaled for rotation between the bars 7 and the upper forward end of the said chain 42 is connected with the working end of the lever 44, which is fulcrumed to one of the bars 7. A gear segment 45 is also connected with one of the bars 7, and the lever 44 carries a spring-actuated pawl 46, which is adapted to engage the said gear-rack 45. Thus it will be seen that when the lever 44 is swung and the chain 42 is moved longitudinally the rear end portion of the shaft 25 may be raised or lowered, as desired. Disks 47 are journaled for rotation upon the spindles 40, and are preferably of the concaved type, with their concaved surfaces facing each other. Stirrups 48 are mounted upon the outer end portions of the shanks 39 and are adapted to receive the feet of an operator who occupies the seat 8.

From the above description it is obvious that as the cotton chopper passes along a row of standing plants, rotary movement is transmitted to the shaft 25 through the stub shaft 21 and its connecting parts, and that as the blades 32 are rotated about the axis of the shaft 25 they will successively come in contact with the stand of plants and chop out superfluous plants. By reason of the fact that the forward ends of the said blades 32 are pointed, and the said pointed ends are curved at the cutting edges of the said blades, it will be seen that as the blades pass transversely through the soil, they will not drag against the roots of the plants left standing in advance of the incision made by the blades. That is to say, by reason of the chamfered configuration of the blades, sufficient space is provided for the machine, as an entirety, to advance while the cotton cutting operation is being performed, without bringing the forward edge portion of the blade in contact with the roots of the plant left standing in the row. Furthermore, it will be seen that should any one of the blades 32 come in contact with a large stone or other obstruction, by reason of the disposition of the said blade with relation to the line of draft and surface of the ground, the force of the impact between the blade and the said object will cause the breaking pin 31 to snap, whereby the blade is free to swing away from the obstruction upon the pin 30; thus relieving the blade and the parts of the attachment from excessive shock. Again it will be seen that as the chopper advances along the row of plants an operator (whose feet are in the stirrups 48) may guide the disks 47 laterally, and thus bring the chopping hoes against the standing plants, irrespective of the nature of the alinement of the plants in the row. In other words, if the plants happen to be out of alinement in the row, the operator may guide the chopping hoes so as to bring them into suitable relation against the plants in the row.

Having described my invention, what I claim as new, and desire to secure, by Letters Patent, is:—

1. In a cotton chopper a shaft journaled for rotation, chopping blades carried by the shaft, a cross-arm pivotally connected with the shaft, spindles attached to the cross-arm, disks mounted upon the spindles, and stirrups also mounted upon the spindles.

2. In a cotton chopper a shaft journaled for rotation, chopping blades carried thereby, a cross-arm pivotally connected with the shaft, spindles carried by the cross-arm, means for raising and lowering the said shaft, disks journaled upon the spindles, and stirrups mounted upon the spindles.

3. In a cotton chopper a shaft journaled for rotation, chopping blades carried by the shaft, a cross-arm pivotally connected with the shaft, spindles having shanks adjustably connected with said cross-arm, disks journaled upon the spindles, and stirrups mounted upon the spindles.

4. In combination with a wheel-mounted frame, a cotton chopper frame attached thereto, a stub shaft journaled for rotation upon the chopper frame, means operatively connecting the said shaft with one of the supporting wheels of the main frame, a chopper shaft, a universal joint connecting the chopper shaft with the stub shaft, chopping-blades carried by the chopper shaft, and steering devices attached to the rear end of the chopper shaft by which a lateral movement may be imparted to the said shaft.

In testimony that I claim the foregoing as my own, I have hereto affixed my signature in the presence of two witnesses.

GORDON W. RICE.

Witnesses:
R. H. GULLEY,
E. C. ENGLISH, Jr.